United States Patent [19]

Zimmerman et al.

[11] Patent Number: 4,541,806

[45] Date of Patent: Sep. 17, 1985

[54] MULTIPLE APTITUDE TESTING DEVICE

[75] Inventors: Bonnie L. Zimmerman, Greenhill Farms; Thomas W. Gannaway, Overbrook Hills; Lawrence J. Resinski, Hatboro; Philip S. DeVita, Richboro, all of Pa.

[73] Assignee: Jewish Employment and Vocational Service, Philadelphia, Pa.

[21] Appl. No.: 416,439

[22] Filed: Sep. 10, 1982

[51] Int. Cl.[4] .............................................. G09B 7/06
[52] U.S. Cl. .................................. 434/258; 434/338; 434/353; 434/362
[58] Field of Search .............. 434/258, 259, 335, 336, 434/338, 350, 351, 353, 365, 224

[56] References Cited

U.S. PATENT DOCUMENTS

| | | | |
|---|---|---|---|
| 3,100,352 | 8/1963 | Boissevain | 434/338 |
| 3,538,626 | 11/1970 | Frank | 434/350 |
| 3,611,588 | 10/1971 | Torretta | 434/258 |
| 4,166,325 | 9/1979 | Weber | 434/338 |

Primary Examiner—Richard C. Pinkham
Assistant Examiner—Leo P. Picard
Attorney, Agent, or Firm—Caesar, Rivise, Bernstein & Cohen, Ltd.

[57] ABSTRACT

A multiple aptitude testing device for electronically evaluating an examinee's capacity or aptitude toward performing various vocational tasks. The device includes a test station which affords five general types of examinations, namely, objective question and answer tests, a manual dexterity test, a finger dexterity test, a hand/eye coordination test, and a hand/eye/foot coordination test. The question and answer examinations entail interchangable overlays which contain questions and possible answers such that the examinee selects what he deems is the correct answer by contacting an appropriate sensor on the housing with an electrically conductive answer probe. The other four examinations entail counters for electronically measuring the number of times the examinee is able to perform a manipulative task during a fixed period of time. The device provides an electronic comparator for automatically grading the examinations and displaying or printing a test score associated with each of said tests. The device 20 is further designed to generally recognize which test is being conducted based on which of the various attachments or overlays are connected to the device. Although the test station is generally self-contained, e.g., not requiring separate answer booklets, writing utensils, etc., the preferred embodiment of the device entails using a separate master control unit which enables simultaneous, synchronized control of up to four test stations.

37 Claims, 6 Drawing Figures

MULTIPLE APTITUDE TESTING DEVICE

BACKGROUND OF THE INVENTION

This invention relates generally to testing devices and more particularly to a multi-function electronic testing device.

Prior art testing methods used for objectively evaluating an examinee's knowledge of a particular subject area or his or her aptitude for performing tasks in a particular academic or vocational field typically entail an examination comprising a set of written objective questions which the examinee answers using a writing instrument and paper.

More sophisticated testing techniques or systems which are available utilize specially designed answer sheets which are arranged to be marked in predesignated locations using a prescribed writing instrument (e.g., a No. 2 lead pencil), thus enabling the test to be electronically graded. Although these prior art systems are generally satisfactory for their intended purpose, they generally still necessitate the use of disposable materials such as answer sheets which must then be graded at some later point in time. To that end, the aggregation of a large quantity of these answer sheets or other written materials tends to be cumbersome to handle as well as to grade, and generally does not enable immediate ascertainment of the test results.

With regard to vocational testing, there is a general lack of adequate means for objectivly evaluating a person's level of motor skill coordination or motor skill manipulative ability as it pertains to the person's capacity for performing various vocational tasks. Consequently, whether a person has sufficient manual dexterity or other motor skills necessary in order to perform various vocational tasks is typically not ascertained prior to that person's demonstrated ability or inability, as the case may be, to perform those tasks while on the job. This obviously, is neither a cost effective nor otherwise desirable method for ascertaining a candidate's ability to satisfactorily perform a particular industrial task.

OBJECTS OF THE INVENTION

Accordingly, it is a general object of this invention to provide a device which overcomes the disadvantages inherent in prior art vocational aptitude testing devices.

It is a further object of the invention to provide a generally self-contained testing device arranged to measure both cerebral as well as manipulative aptitudes without necessitating the use of disposable answer forms, test booklets, paper, pencils, writing instruments and the like.

It is a further object of the invention to provide a device which is readily utilized to administer an objective test consisting of a plurality of multiple choice questions, in a manner which provides means for automatically evaluating the examinee's performance (i.e., automatically grading the examination).

It is a further object of the invention to provide testing means which enable simultaneous evaluation of several examinees when a plurality of testing units are being used and controlled by a single master control unit.

It is still a further object of the invention to provide a device which objectively measures a person's aptitude for performing various cerebral as well as manipulative tasks in a reliable and efficient manner, utilizing a generally self-contained examination device.

SUMMARY OF THE INVENTION

These and other objects of the instant invention are achieved by providing an electronic testing device which utilizes a plurality of objective test questions to evaluate an examinee. The device includes a housing and overlay means which is releasably secured to the housing. The overlay means contains a plurality of questions and a plurality of possible answers corresponding to each of those questions. The overlay means further includes coding means which communicate with corresponding means on the housing to specify a set of correct answers to the questions. Electronic selector means enables the examinee to select an answer for each of the questions. Comparison means then compares the selected answers with the correct set of answers. To that end, indicator means responsive to the comparison means produces a test score signal to indicate the degree of correspondence between the correct set of answers and the selected answers, thus indicating the examinee's level of performance on the test.

DESCRIPTION OF THE DRAWING

Other objects and many of the attendent advantages of the invention are readily appreciated as the same becomes better understood by reference to the following detailed description when considered in connection with the accompanying drawing wherein.

DETAILED DESCRIPTION OF PREFERRED EMBODIMENT

Figure 1:
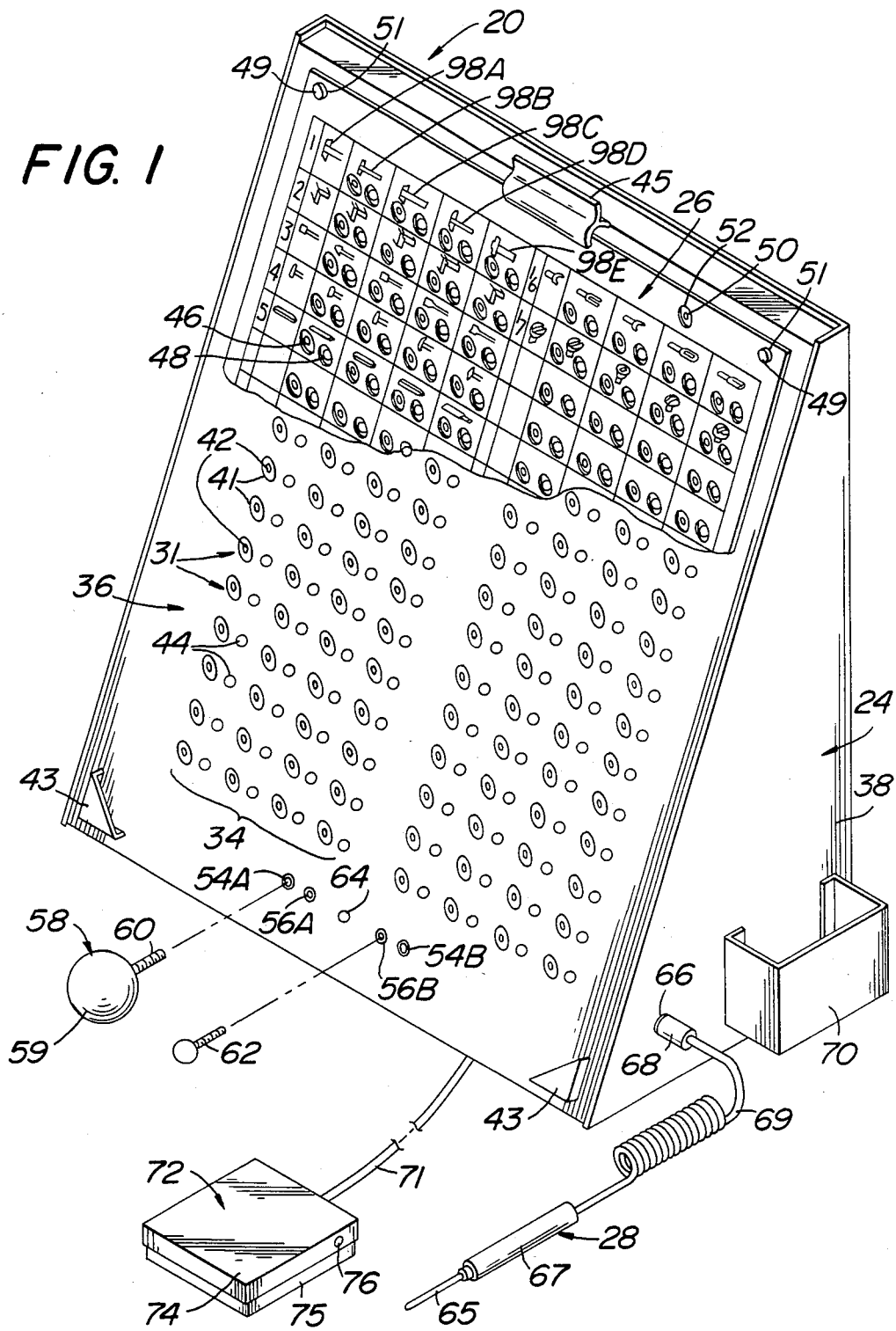
FIG. 1 is a perspective view of one test station of a multiple aptitude test device, including a portion of a question and answer overlay and various other attachments used in combination with the device, all constructed in accordance with this invention.

Referring now to the various figures of the drawing wherein like reference characters refer to like parts there is shown at 20 in FIG. 1 one test station or unit of a multiple aptitude test device constructed in accordance with the instant invention. The device 20 is designed to evaluate the vocational aptitudes of an examinee based on his or her selected answers to a plurality of objective test questions, typically of the multiple choice type. Additionally, the test station 20 is designed to objectively evaluate a person's actual capacity for performing various tasks requiring motor skills (motor skills shall refer to manual dexterity, finger dexterity, hand/eye coordination and hand/eye/foot coordination) using various objects or attachments which the examinee must manipulate as shall be described later. The testing unit 20 is entirely self-contained in that it does not require separate question booklets, disposable answer sheets or writing instruments. Moreover, the examinee's level of performance on a given test is electronically evaluated and a test score is almost immediately displayed following the taking of the test either by digital display means or by being printed as hard copy by a conventional electronic printing device.

Figure 3:
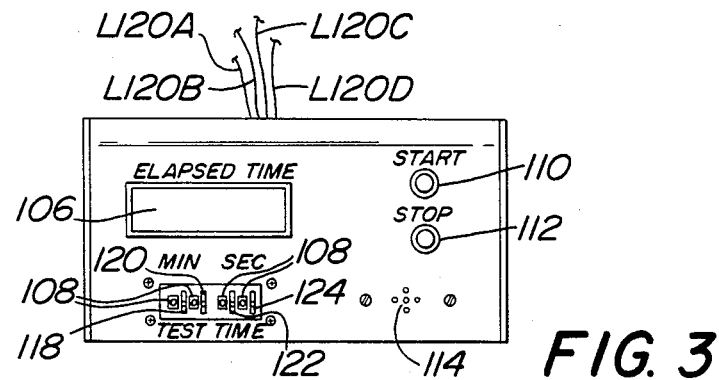
FIG. 3 is a top plan view of a master-control unit constructed in accordance with this invention and used in combination with at least one test station.

Although as just mentioned, the test station device 20 can be used alone as a self-contained unit, the preferred embodiment of the invention makes use of a master-control unit 22 as shown in FIG. 3. The master control unit 22 enables the test administrator to synchronize and simultaneously control a plurality of separate test stations, each one being identical to the one shown at 20 in FIG. 1. The master control unit also provides various other convenience features to be described later.

Figure 2:
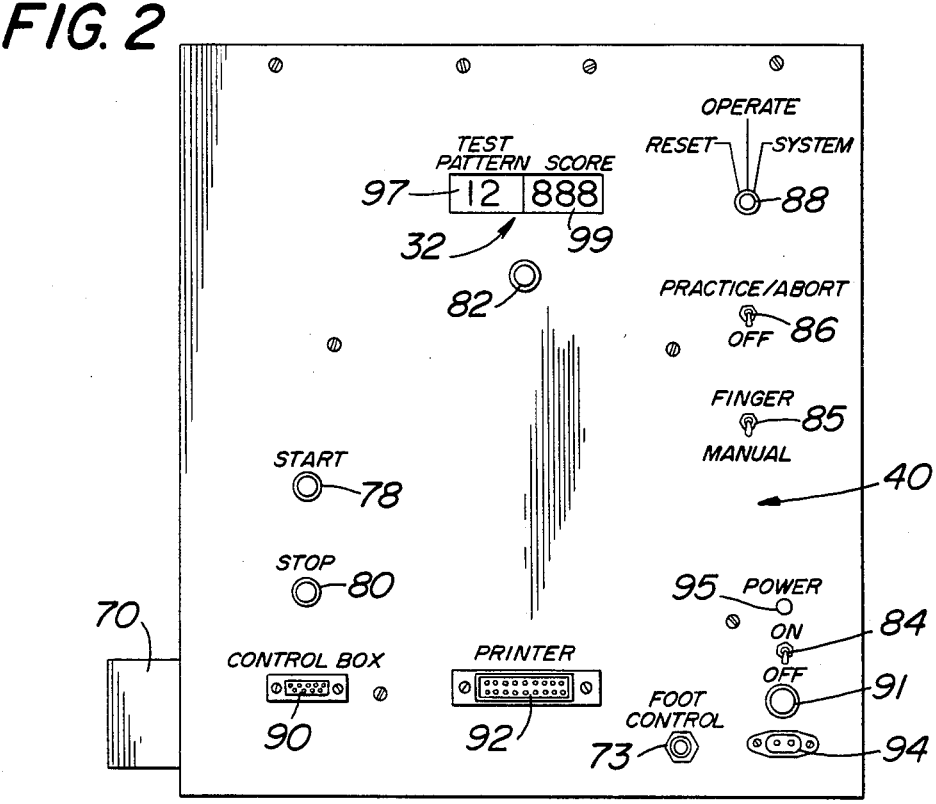
FIG. 2 is a reduced rear elevational view of the test station.

The test station 20 basically comprises a housing 24, overlay means 26, probe means 28, electronic evaluator means 30 (FIGS. 4A and 4B), sensor means 31, and indicator or display means 32 (FIG. 2).

To administer a question and answer type examination, e.g., a multiple choice test, overlay means 26 containing questions and a plurality of possible answers to each question is temporarily mounted on the test station housing 24. The examinee selects what he or she deems is the correct answer to each question by contacting with the probe means 28 the sensor or electrical contact of the sensor means 31 associated with (e.g., situated adjacent) the selected answer for each question. Upon completion of the examination, the electronic evaluator means 30 electronically compares the selected answers with a predetermined set of correct answers and then produces a signal which the indicator means 32 displays or alternatively prints (by means of an optional printer) as a test score.

As mentioned above, the test station 20 also includes various attachments and other objects which shall be described later, for objectively evaluating the examinee's capacity for performing various tasks requiring manipulative motor skills.

The electronic evaluator means 30 includes a plurality of electronic circuits which are located within the test station's housing 24 and are best illustrated by means of a functional block diagram such as the one shown in FIGS. 4A and 4B and which shall be described in detail later.

With regard to the multiple choice question and answer examinations, the test station 20 is arranged to be used in combination with a plurality of interchangable overlays 26, with each overlay 26 containing up to 30 multiple choice questions. In that regard, each question contains up to four possible answers from which the examinee is to select the one correct answer. Each overlay comprises an opaque, semi-flexible sheet made from an extrudable molded plastic, such as polystyrene, upon which the questions and associated answers are printed. The overlays, of course, may also be constructed of a wide variety of other durable materials capable of containing or representing written material. Alternatively, the questions and answers may be secured to the overlays by means of adhesive labels.

The test station 20 is arranged to automatically recognize which overlay is being used, with the present embodiment of the device having recognition capabilities for recognizing as many as 15 different overlays and for storing in memory an equal number of answer patterns. However, the test station 20 may readily be adapted to receive additional overlay tests if desired.

A commercial embodiment of the test station 20 provides means for administering five general types of examinations and a total of 19 separate examinations when 15 question and answer overlays are used. In addition to the 15 question and answer examinations, this invention provides a hand/eye coordination test, a hand/eye/foot coordination test, a manual dexterity test and a finger dexterity test, each of which shall be described in detail later.

Any number and/or combination of the 19 above referred to tests may be given to an examinee either sequentially at one test session or at different sessions to obtain a comprehensive evaluation of the examinee's vocational aptitudes. It should further be pointed out that the device 20 is not restricted to being used for measuring vocational aptitudes since the question and answer examinations may readily be used for any purpose whatsoever, e.g., measuring a person's I.Q., knowledge in a particular subject area, etc.

In order to administer a question and answer type examination, e.g., a multiple choice examination, an overlay 26 containing up to 30 questions and up to four possible answers associated with each of those questions is secured to the test station 20. For each particular question on the overlay, the examinee selects the answer he or she deems correct by touching the probe means 28 to a sensor 31 (to be described later) on the front panel of the housing which is adjacent the answer being selected. Upon completion of the test, the electronic evaluator means 30 electronically compares the selected answers to a predetermined set of correct answers, generating a signal which the indicator means 32 converts into a displayed test score to indicate the examinee's level of performance on the test.

With regard to the four skill examinations, the examinee's level of performance is measured in terms of how many times he or she is able to perform a given manipulative task within a fixed period of time. In that regard, the probe means 28, a foot pedal (to be described later) and a pair of threaded screw-in members (also to be described later), are utilized alone or in various combinations with one another with the test station for the different motor skill tests. The electronic evaluator means 30 in the station evaluates the examinee's performance on the tests by producing a signal which the indicator means 32 converts into a digitally displayed test score.

Referring to FIG. 1, the test station 20 comprises a generally triangularly shaped housing 24 which includes a front wall or panel 36, a pair of matching, generally triangularly shaped side wall 38 (only one side wall being shown), a bottom wall (not shown) and a rear wall 40 (FIG. 2). The front panel 36, the rear wall 40 and the bottom wall are each generally rectangularly shaped with the rear wall and bottom wall joining at approximately right angles to each other. The front panel 36 and bottom surface join at approximately a 60 degree angle to each other while the front panel and rear wall join at approximately a 30 degree angle to each other. Thus, when the bottom wall of the test station housing 24 is resting on a generally horizontal surface, e.g., a desk top, the front panel 36 of the station is canted upward from horizontal at approximately a 60 degree angle. This feature promotes ease of vision and operation by the examinee.

As shown in FIG. 1, the front panel 36 includes the heretofore identified sensor means 31. Those means comprise one-hundred-twenty individual sensors or contacts 42 and one-hundred-twenty associated LEDs 44 arranged in thirty groups 34 of four contacts 42 and four LEDs 44, each. In particular, in each group 34, each contact 42 is paired with an associated LED 44. Moreover, the sensor/contact groups 34 are divided into two main sections of fifteen groups each, one section arranged in a vertical column on the left hand side of the front panel 36 and the other section similarly arranged on the panel's right hand side. Each of the sensor/contacts 42 comprises an electrical contact recessed within a hole 41 in the front panel of the housing.

In the question/answer test mode, when a contact 42 is touched with the probe means 28, its paired LED 44 is illuminated. The sensor 42 further transmits a signal to the electronic evaluator means 30 to indicate that the answer associated with that particular contact 42 had been selected. In that regard, when a particular overlay 26 containing questions and possible answers is attached to the front panel 36, each possible answer on the overlay is aligned to correspond with a particular contact 42 and LED 44 pair. Moreover, the overlay 26 contains one-hundred-twenty holes 46 corresponding in position to the one-hundred-twenty contacts 42 and one-hundred-twenty holes 48 corresponding in position to the one-hundred-twenty LEDs, respectively. Thus, to select a particular answer the probe means 28 is readily inserted through a hole 46 in the overlay sheet 26 in order to touch the corresponding sensor 42. The LEDs (visible through holes 48) enable the examinee to later see which answer he has selected.

Adjacent the top corners of the front panel 36 are a pair of mounting pegs 49 which project through corresponding holes 51 in the overlay. The pegs hold the overlay 26 at precisely the correct position by aligning the holes 46 and 48 of the overlay 26 with the contacts and LEDs 42 and 44, respectively, on the front panel 36. In addition, a set of bottom retainers 43 are located adjacent the two bottom corners of the front panel 36. A top clamp 45 is located at an upper central portion on the front panel. The retainers serve to hold the bottom corners of the overlay, while the top clamp holds the top edge of the overlay thus, further securing the overlay to the panel.

Also situated on the front panel 36 is a set of four optical sensors 50 (e.g., phototransistors) which coact with circuitry, to be described later, to electronically ascertain whether an overlay is in place and, if so, which overlay test is present. In that regard, each overlay contains up to three holes 52 at positions corresponding to any of the four sensors 50. Thus, ambient room light passing through the holes 52 is received (by the binary code signal) indicative of the particular overlay which is being used. In other words, each overlay is coded with a binary code formed by the combined presence and absence of holes 52 at the four locations corresponding to the four photocells 50. When all four photocells are exposed to light (i.e., are not covered), the device 20 recognizes this situation to mean that an overlay is not being used and that one of the four motor skill tests (to be described later) is being conducted. The binary code produced by the presence and absence of holes 52 in the overlay is used by the evaluator means to select the appropriate answer set to be utilized in grading the test. The binary coded signal is also used to enable the indicator means 32 to display an identification number associated with the test being run.

The test station 20 also includes 2 pairs of internally threaded screw holes used to test the examinee's manual dexterity. Those holes pairs are 54A and 54B and 56A and 56B. The left side hole of each pair is denoted by the letter "A" and the right side hole by the letter "B". The first pair of holes 54A and 54B is used in combination with a relatively large externally threaded knob member 58 to test an examinee's manual dexterity. The manual dexterity test measures the examinee's capacity for quickly screwing the knob 58 into and then out of the holes 54A and 54B, in alternating succession.

The second pair of screw holes 56A and 56B is of a substantially lesser bore than the first pair and is used to test the examinee's finger dexterity by measuring his or her capacity for quickly threading a relatively small externally threaded screw member 62 into and out of holes 56A and 56B. Adjacent and between the two pairs of screw holes is an indicator lamp 64 (e.g., an LED) which momentarily lights, i.e., blinks, to indicate to the examinee that he or she has screwed either object 58 or 62, respectively, into the appropriate screw hole sufficiently far to have registered a "score" with the testing device.

The probe means 28 basically comprises an elongated member having a conductive tip 65, an electrically insulated handle portion 67, and a male electrical plug 68. The plug is electrically connected to the tip 65 by means of a flexible electrical conductor 69. The probe means 28 readily attaches to or is removed from the side of the device's housing. To that end, situated on the side wall 38 of the housing is a female connector 66 arranged to receive the mating male plug 68. On the opposite side wall (not shown) of the housing is a similar female connector, also arranged to receive the same probe 28 should the examinee feel more comfortable using a probe which is connected to the left hand side of the housing 24.

The side wall 38 of the housing also includes a storage receptacle 70 for storing the AC power line cord (not shown), the probe means 28, the knob 58, and the screw 62, when these respective members are not being used.

The bottom wall of the housing 24 includes four rubber feet (not shown) to inhibit movement of the test station along the horizontal surface upon which the station is resting. In addition to the rubber feet, the bottom wall of the housing 24 includes a threaded hole (not shown) to enable the device to be bolted to the horizontal supporting surface, where desired.

Referring to FIGS. 1 and 2, a foot pedal 72 is used when conducting a test for measuring the examinee's hand/eye/foot coordination. The pedal 72 is connected to the device 20 by means of an electrical conductor 71. The conductor terminates in a male plug (not shown) which is readily connected to a corresponding female connector 73 on the back wall of the housing (FIG. 2) when the pedal 72 is to be used.

The foot pedal 72 is used for measuring the examinee's capacity for performing various vocational tasks requiring foot movements similar to those required in depressing and then releasing a foot pedal. The pedal 72 basically comprises an upper plate 74 and a lower plate 75 pivotably connected to each other by means of a hinge rod 76 and includes an electrical contact (not shown) attached to the upper plate and a separate electrical contact attached to the lower plate. The contacts are in communication with means in the evaluator such that when the upper plate is stepped on, its contact contacts the contact of the lower plate 75 to close an electrical circuit in the evaluator, causing an electrical signal to be generated.

As can be seen in FIG. 2, the rear surface 40 of the test station 20 also includes various operational controls, e.g., a start button 78, a stop button 80, a sequence button 82, an on/off switch 84, a manual/finger dexterity select switch 85, a practice abort switch 86 and an operate/reset (or key switch) 88.

The on/off switch 84 turns the power to the test station 20 either on or off, respectively.

The start button 78 is arranged to start the test and the stop button 80 is arranged to stop the test when depressed, respectively.

The sequence button 82 is pressed in order to display the test scores of previously conducted tests.

The manual/finger dexterity select switch 85 selects either the manual dexterity or finger dexterity mode of operation depending on the position of the switch.

The practice/abort switch 86 enables the examinee to take a "trial-run" of a test before taking the actual test which is to be graded. To that end, when the switch 86 is moved to the abort position, the previously selected answers or scores for the particular test being conducted are cleared from memory so that the test may be re-started.

The operate/reset switch 88 is generally referred to as a "key switch" since a key (not shown) must be used in order to operate the switch. The key switch 88 controls the operation of the station 20, as shall be described later. The key requirement is obviously for security reasons to enable only the test administrator or some other designated person(s) to control the operation of the device 20. Also situated on the rear wall of the test station is a master control unit jack 90, a cap 91 providing access to a fuse holder, a printer jack 92, an AC line cord jack 94 and a power lamp 95.

Also situated on the rear wall of the housing is the previously mentioned indicator means 32 which displays the examinee's test score along with a two digit identification number identifying the particular test to which the score relates. The indicator means 32 comprises a five digit LED display. The first and second digits comprise the test identification display means 97 while the third, fourth and fifth digits comprise the test score display means 99. In that regard, the test identification display means 97 utilizes a two digit number to identify which test score is being displayed while the test score display means displays a three digit test score number to indicate the level of performance on that particular test.

The five different types of tests made available using the device 20 shall now be described individually in detail.

As shown in FIG. 1, a question and answer type examination is run by first attaching a particular question and answer overlay 26 to the front panel 36 of the device 20. In so doing, either 1, 2 or 3 of the four optical sensors 50 on the front panel 36 are covered. Thus, as mentioned above, the station's evaluator circuitry automatically recognizes this situation to mean that a question and answer examination is being run since at least one of the four optical sensors 50 is covered by the overlay 26. The exact number and combination of sensors covered by the overlay identifies the particular question and answer overlay exam being utilized.

When the AC line cord jack 94 shown in FIG. 2 is connected by means of a conventional AC line cord to a standard 110 VAC electrical outlet, and the power switch 84 is moved to the "on" position, the power light 95 becomes illuminated to indicate that the station 20 is in operation.

Before commencing the examination, the key switch 88 is rotated to the "test" position causing all of the front panel LEDs 44 as well as all of the digits of the indicator means 32 to light, thus assuring the test administrator that all of the LEDs and display means are functioning. Once the test administrator is satisfied that the unit 20 is functioning properly, the key switch 88 is turned to the "reset" position causing the front panel LEDs and the score display LEDs 99 to extinguish and the test pattern display portion 97 of the indicator means 32 to display the two digit number "00". At this point the station is ready for use in a testing operation.

When the instructor presses the start button 78 on the rear panel the system 20 is actuated, allowing the examinee to start the test. At this point, a two digit number identifying the particular test being run appears on the test identification display means 97. The examinee then selects his first answer by inserting the tip 65 of the answer probe 28 into the hole 46 adjacent the answer he or she wishes to select for the particular question. The tip 65, thus makes electrical contact with the contact 42. The examinee repeats this process for each question on the test until the test is stopped either by the test administrator, or automatically by operation of the master control unit 22 (as shall be described later), or the examinee has answered all of the questions and is satisfied with the answers he or she has selected.

In FIG. 1, there is shown a portion of an exemplary examination overlay sheet having questions which require the examinee to compare and match the figures. The "question" figure is located on the left of the overlay sheet and designated by the reference numeral 98A. The four possible "answer" figures are to the right of the "question" figure and are designated by the reference numerals 98B-98D, respectively. The examinee must select the answer figure which best matches the question figure. For instance, in FIG. 1 referring to question No. 1, to select the correct answer the examinee must touch the probe 28 to the answer 98C since the "T-square" shown there best matches the T-square shown on the question portion 98A of the overlay. When the examinee selects his or her answer by touching the answer probe 28 to a particular answer contact 42, the LED 44 adjacent that contact is illuminated. An answer may be changed at any time during the test and prior to the test being scored merely by touching the probe 28 to another answer hole 42 for that question. This results in the LED 44 adjacent this latter selection being illuminated and the originally illuminated LED being extinguished. Furthermore, an answer is eliminated by touching the hole next to the lit LED with the probe 28.

Where a master control unit 22 is not being used, the examination continues until such time that the test administrator has determined that the allotted time for the test has elapsed. At that point, the administrator presses the stop button 80 on the rear panel 40. This action terminates the examination by preventing the examinee from selecting and/or changing any more answers. All of the lit LEDs on the front panel are at this point extinguished. In addition, the pressing of the stop button 80 enables the automatic scoring circuitry in the evaluator means to operate. To that end, depending upon which overlay, and thus which test was given, the examinee's answers are stored in memory means, the correct answer pattern is automatically selected and the examinee's stored answers are sequentially compared to those answers. Each question correctly answered is scored while each question either incorrectly answered or left unanswered is ignored. The test score, i.e., the number of correct answers, is also stored in memory along with the test number identifying the particular test to which the score relates. This action enables the score and identification number to later be displayed by the indicator means 32. The scores and identifying numbers remain in memory until such time that either the power is removed from the test station or the key switch is moved to the reset position. At this point the test administrator either administers another examination or terminates the test session.

Each overlay test is conducted in precisely the same manner as just described. In that regard, overlays are removed from the test station by their being pulled through and free of both the support pegs 49 and the retainers 43 and 45, respectively. Similarly, the overlays are attached in place by inserting the support pegs 49 through those same holes 51 and inserting the top edge and bottom corners into the retainers 45 and 43, respectively.

In addition to overlay tests which entail two-dimensional overlays containing written questions and answers, also available are spacial perception overlay tests which test the examinee's ability to compare or match various three-dimensional (i e., raised) figures or objects formed on or from the overlay sheets. These tests too are conducted in the same manner as described for the other question and answer examinations referred to above.

The next type of test to be described is the hand/eye coordination test. The absence of an overlay 28 covering one or several of the optical sensors 50, in combination with the answer probe 28 being connected and the foot pedal 72 not being connected, is recognized by the evaluator circuitry of the station 20 to mean that the hand/eye coordination test is being conducted.

When the test administrator pushes the start button 78, a single LED 44, randomly selected from among the 120 LEDs on the front panel, is illuminated. The examinee then touches the answer probe 28 to the contact 42 adjacent the illuminated LED. When the correct contact 42 is touched, the illuminated LED 44 is extinguished and another randomly selected LED 44 "lights up". The examinee repeats this process by touching the answer probe to the hole next to that LED. This process continues with the object of the test being for the examinee to extinguish as many LEDs as possible within a fixed period of time. To that end, the evaluator means 30 includes circuitry which counts the number of LEDs extinguished during that time period. This process continues until such time that the test administrator depresses the stop button 80, whereupon no more scores are accepted, all LEDs are extinguished and the total number of correct responses is stored in memory so that a test score may later be displayed by the indicator means 32.

The combined absence of an overlay 26, an answer probe 28 and a foot pedal 72 is recognized by the device 20 to mean that either the manual dexterity or the finger dexterity test is being conducted. These two tests differ from each other only with regard to the size of the object (e.g., a screw as opposed to a knob) which the examinee must work with. In that regard, the position of the manual/finger dexterity select switch 85 determines which of these two tests is being run.

In the manual dexterity test mode, a threaded knob 58 is used. The knob 58 comprises a generally spherical handle portion 59 which is connected to an externally threaded bolt 60. The examinee must screw the bolt 60 into and out of a hole 54A. The bolt 60 must then be screwed into and out of a second hole 54B. This process is repeated for the duration of the test, alternating between holes 54A and 54B, with the object of the test being to screw the knob into and out of these respective holes a maximum number of times. Since the knob's handle 59 is approximately two (50.8 mm) to three inches (76.2 mm) in diameter, this test measures the examinee's manual dexterity for manipulating fairly large objects.

The holes 54A and 54B, respectively, each contain an electronic switch (not shown) which causes a signal to be generated whenever the bolt 60 is screwed into a respective hole sufficiently far to push a movable contactor portion of the switch into contact with a stationary contactor, closing a circuit. When the bolt 60 is removed from the respective hole, the movable contactor returns to its normal position to open the switching circuit.

The test begins when the test administrator presses the start button 78, at which time the examinee begins threading the knob 58 into one of the two holes 54A or 54B. The examinee threads the knob into the hole until such time that a dexterity test indicator light (LED) 64 on the front panel flashes. When the light flashes the examinee screws the knob out of the hole (e.g., 54A), and then screws it into the other threaded hole (e.g., 54B) until the LED lights once again. Each time the LED lights, the test score is incremented by one. As mentioned above, the exam is arranged such that the examinee must alternate between the two holes 54A and 54B in order to score. When the test administrator presses the stop button 80 on the rear panel of the device, no more scoring can take place and the examinee's score is recorded in memory so that it may later be displayed by the indicator means 32.

When the switch 85 is set to the "finger" position and all of the attachments and overlays are disconnected, the finger dexterity test is put into operation. The finger dexterity test is essentially identical in all respects to the manual dexterity test, except with the finger dexterity test a narrow screw 62 is used in place of the larger knob 58. Thus, the narrow screw 62 is screwed into and out of the pair of screw holes 56A and 56B in a manner identical to that which was described heretofore for the manual dexterity test. Moreover, the screw holes 56A and 56B acuate the same respecttive switches (not shown) which are used when conducting the manual dexterity test. Likewise, the number of scores is recorded in memory along with the test identification number associated with the finger dexterity test in order that this information may later be displayed by the indicator means 32.

The final test to be described is a hand/eye/foot coordination test. The hand/eye/foot coordination test utilizes both an electronic foot pedal 72 and the probe means 28. In that regard, the test station 20 automatically recognizes that a hand/eye/foot coordination test is being run whenever the foot pedal 72 and probe means 28 are both connected and no overlay is present. The hand/eye/foot coordination test is very similar to the hand/eye coordination test described above except that in this case, to register a score the examinee must touch the probe means 28 to the contact 42 adjacent a randomly lit LED 44 and then step on the foot pedal 72 in that order. Once both of these actions have been successfully performed, the lit LED is extinguished and another randomly selected LED lights up. Obviously, this test measures the examinee's ability to perform a task requiring hand and eye coordination combined with foot coordination. Performance on the hand/eye/foot coordination test is measured in terms of the number of times, within a fixed time period, the examinee is able to complete a cycle of touching the sensor contact 42 adjacent the lit LED 44 with the probe 28 and then depressing the foot pedal 72. The examination is terminated when the examiner presses the stop button 80, as is the case with the other examinations. Moreover, in all other respects except those specifically mentioned and described as being different, this examination is identical to the hand/eye coordination examination described above.

Figure 4A:
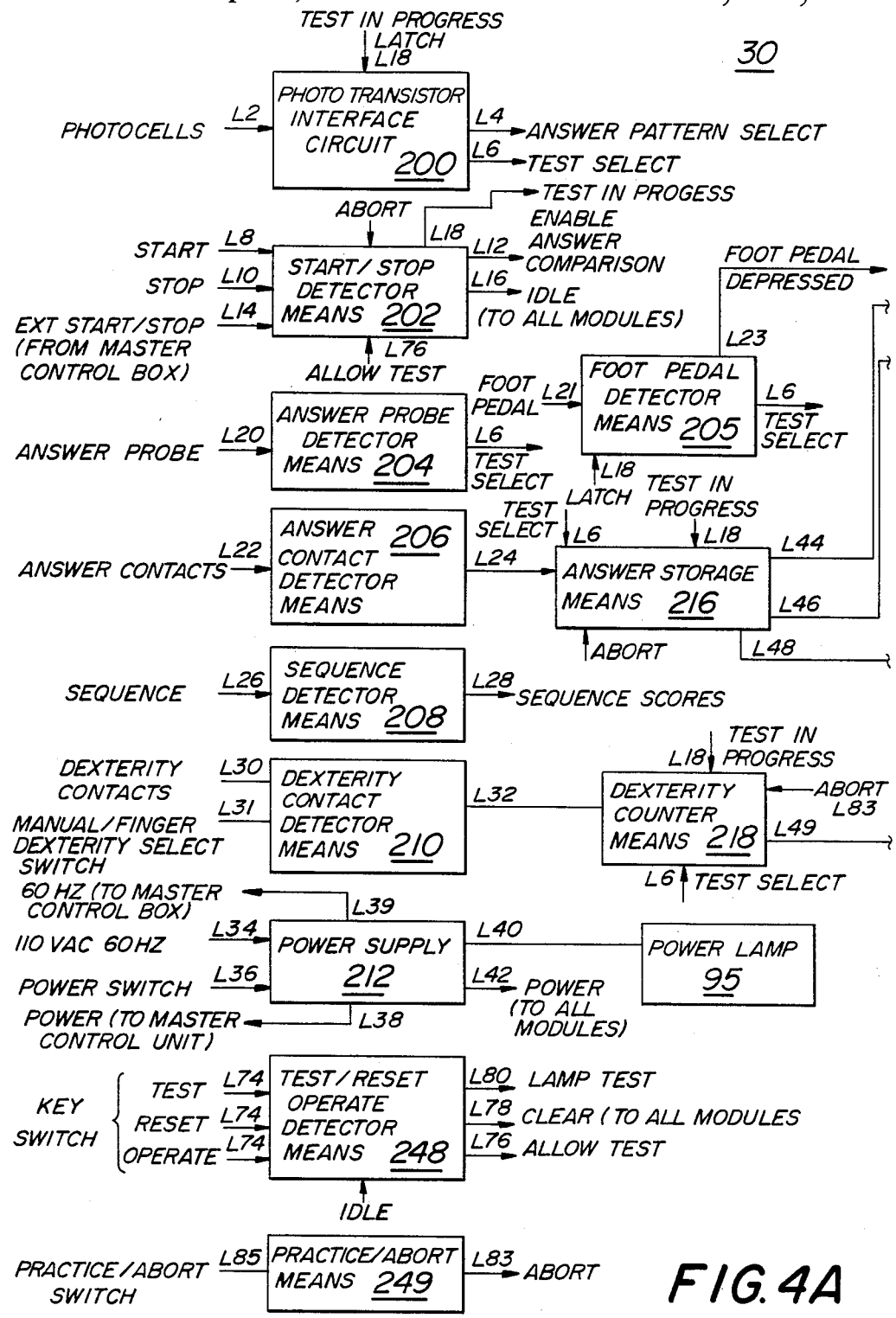
FIGS. 4A and 4B together comprise a functional block diagram of one test station.
Figure 4B:
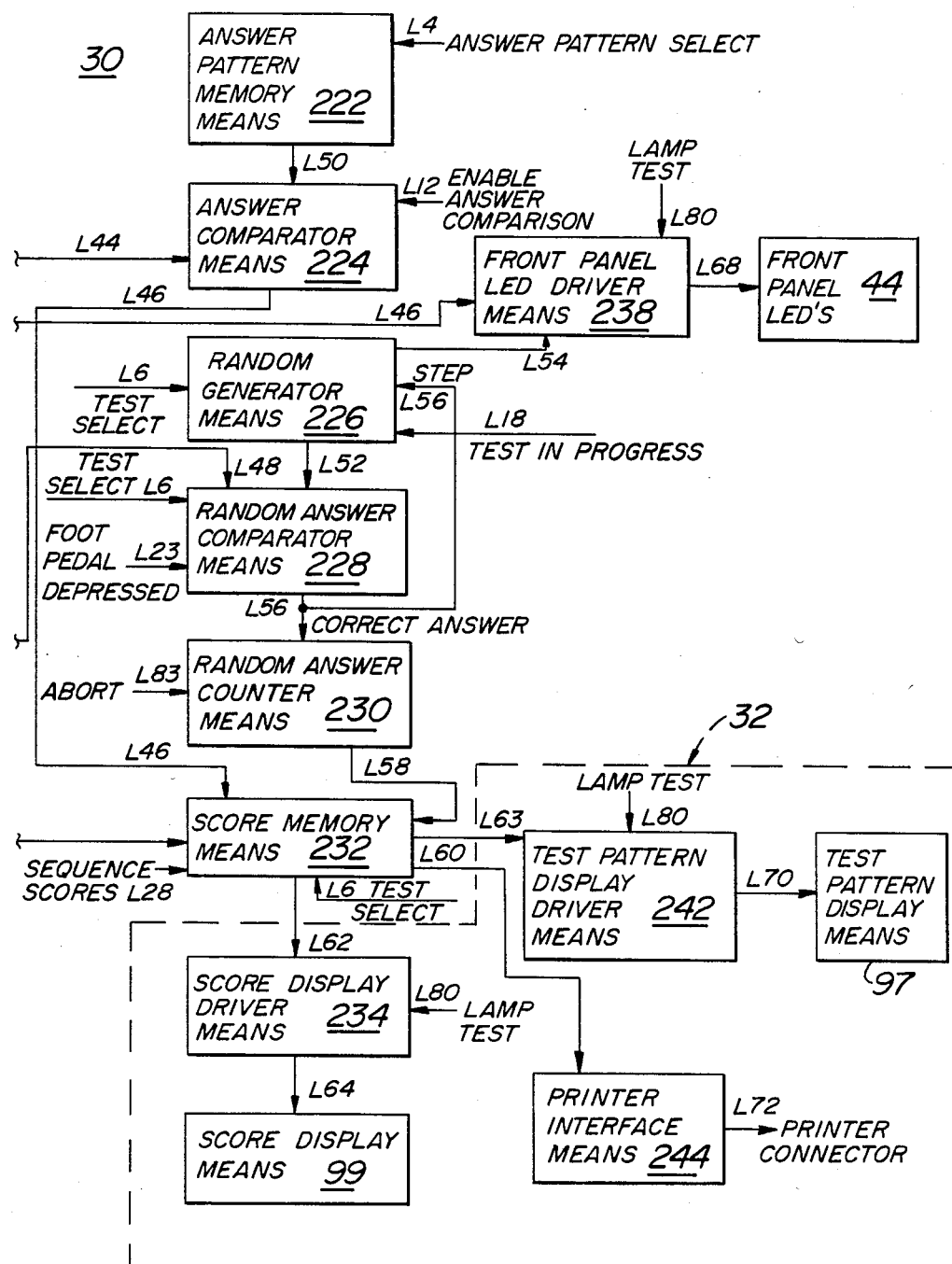

In FIGS. 4A and 4B, the various functional units comprising the test station 20 are shown in terms of a functional block diagram. It should be pointed out that while the electrical circuitry making up the respective functional blocks of the test station is conventional and well within the understanding of those skilled in the relevant art, their interconnection and interrelationship constitutes an aspect(s) of this invention.

As shown in FIGS. 4A and 4B, the device 20 basically comprises the following circuits in the form of functional blocks or modules: phototransistor interface circuit 200, start/stop detector means 202, answer probe detector means 204, foot pedal detector means 205, answer contact detector means 206, sequence detector means 208, dexterity contact detector means 210, power supply 212, answer storage means 216, dexterity counter means 218, a power lamp 95, answer pattern memory means 222, answer comparator means 224, random generator means 226, random answer comparator means 228, random answer counter means 230, score memory means 232, score display driver means 234, score display means 99, front panel LED driver means 238, front panel LEDs 44, test pattern display driver means 242, printer interface means 244, test pattern display means 97, test/reset operate detector means 248 and practice abort means 249.

The above mentioned circuits are interconnected as follows: The phototransistor interface circuit 200 is connected to the photocells 50 by bus L2 and to the answer pattern memory means 222 by line L4. The phototransistor interface circuit 200 is also connected to the answer storage means 216, the dexterity counter means 218, the random generator means 226, the random answer comparator means 228 and the score memory means 232 by line L6. The start/stop detector means 202 is connected to the start button 78 by line L8, to the stop button 80 by line L10, to the answer comparator means 224 by line L12, to the master control unit 22 (when a master control unit is being used) by line L14 and to all of the functional blocks shown in FIGS. 4A and 4B by line L16. Additionally, the start/stop detector means 202 is connected to the phototransistor interface circuit 200, to the dexterity counter means 218, to the answer probe detector means 204, to the foot pedal detector means 205, and to the random generator means 226 by line L18. The answer probe detector means 204 is connected to the answer probe 28 by line L20 and to each of the answer storage means 216, the dexterity counter means 218, the random generator means 226, the random answer comparator means 228 and the score memory means 232 by line L6. The foot pedal detector means 205 is connected to the foot pedal 72 by line L21, to the random answer comparator means 228 by line L23, and to each of the answer storage means 216, the dexterity counter means 218, the random generator means 226, the random answer comparator means 228 and the score memory means 232 by line L6. The answer contact detector means 206 is connected to the answer contacts 42 by bus L22 and to the answer storage means 216 by line L24. The sequence detector means 208 is connected to the sequence button 82 by line L26 and to the score memory means 232 by line L28. The dexterity contact detector means 210 is connected to the dexterity contacts 54A, 54B, 56A and 56B by line L30, to the manual/finger dexterity select switch 85 by line L31 and to the dexterity counter means 218 by line L32. The power supply 212 is connected to a 110 volt AC, 60 Hz electrical power source by line L34, to the power switch 84 by line L36, to the master control unit 22 (when a master control unit is being used) by lines L38 and L39, to the power lamp 95 by line L40 and to each of the functional blocks shown in FIGS. 4A and 4B by line L42. The answer storage means 216 is connected to the answer comparator means 224 by line L44, to the front panel LED driver means 238 by line L46 and to the random answer comparator means 228 by line L48. The dexterity counter means 218 is connected to the score memory means 232 by line L49. The answer pattern memory means 222 is connected to the answer comparator means 224 by line L50. The random generator means 226 is connected to the random answer comparator means 228 by line L52 and to the front panel LED driver means 238 by line L54. The random answer comparator means 228 is connected to both the random answer counter means 230 and to the random generator means 226 by line L56. The random answer counter means 230 is connected to the score memory means 232 by line L58. The score memory means 232 is connected to the printer interface means 244 by line L60, to the score display driver means 234 by line L62 and to the test pattern display driver means 242 by line L63. The score display driver means 234 is connected to the score display means 99 by line L64. The front panel LED driver means 238 is connected to the front panel LEDs 44 by line L68. The test pattern display driver means 242 is connected to the test pattern display means 97 by line L70. The printer interface means 244 is connected to the printer jack 92 by line L72. The test/reset operate detector means 248 is connected to the key switch 88 by line L74, to the start/stop detector means 202 by line L76 and to each of the functional blocks shown in FIGS. 4A and 4B by line L78. The test/reset operate detector means 248 is also connected to the score display driver means 234, the front panel LED driver means 238, and the test pattern display driver means 242, by line L80. The practice/abort means 249 is connected to the start/stop detector means 202, the answer storage means 216, the dexterity counter means 218 and the random answer counter means 230 by line L83 and to the practice/abort switch 86 by line L85.

Having described the manner in which the various functional blocks shown in FIGS. 4A and 4B are interconnected to make up the station 20, the operation of the testing station 20 shall now be described in terms of the operation of the circuits shown in the functional block diagram of FIGS. 4A and 4B.

As stated earlier, the station 20 automatically senses which test is being run (except with regard to determining which of the two dexterity tests is being run). Thus, the phototransistor interface circuitry means 200 receives signals produced by the phototransistors 50 and converts those signals to levels which can readily be used by the remainder of the test station 20. A "test select" signal is produced indicative of the particular phototransistors which are covered by an overlay 26, assuming an overlay test is being run. This signal is received by the dexterity counter means 218, the random generator means 226 and the score memory means 232 via line L6. That signal, in combination with signals produced by the answer probe detector means 204, the foot pedal detector means 205 and the dexterity contact detector means 218 determine the test mode of the device 20 (i.e., which test is being run).

If an overlay test is being run, the coding 52 on the overlay 26 establishes the proper answer pattern to be used in scoring the test. The answer pattern identification information is contained in the answer pattern select signal which is produced by the phototransistor interface circuit 200 in response to signals from the phototransistors. The answer pattern select signal is transmitted by bus L6 to the answer storage means 216, the dexterity counter means 218, the random generator means 226 and the score memory means 232.

The start/stop detector means 202 detects when the test administrator pushes either the start button 78 or the stop button 80, or when the test is started or stopped by the master control unit 22 (to be described in greater detail below). The start/stop detector means 202 generates a "test in progress" signal when the test is started either via the start push button 78 or by an external start signal from the master control unit 22.

The "test in progress" signal latches the signals produced by the foot pedal detector means 205, the answer probe detector means 204, the dexterity counter means 218, the random generator means 226 and the phototransistor interface circuitry means 200 to prevent a signal change from occurring should there be a change in the state of the photocells or the presence of an answer probe or foot pedal, once a test has begun. This feature insures that accidental removal of the answer probe, the foot pedal or removal of the overlay means 26 from covering the sensors 50 will have no effect on the operation of the device 20 with regard to a test already in progress.

When one of the overlay tests is being run, the "test in progress" signal generated by the start/stop detector means 202 actuates or enables the answer storage means 216. The primary input to the answer storage means 216 comes from the answer contact detector means 206. The answer contact detector means 206 determines whether the tip 65 of the answer probe 28 has made electrical contact with an answer contact 42 and if it has, to which one. In other words, the answer contact detector means 206 determines which question was answered and also, which answer to that question was selected. The answer storage means 216 includes memory means which stores this information for later comparison with a correct set of answers. The answer storage means 216 is sometimes referred to as a one-of-four circuit in that it stores either the number 1, 2, 3, or 4 corresponding to whether the first, second, third or fourth answer, respectively was selected. The first to fourth answers are arranged from left to right on the overlay means 26.

The answer storage means 216 also determines whether another answer had previously been selected for that particular question. If another answer had previously been selected for the question, the first answer is erased from memory and the new answer is stored in its place causing the front panel LED 44 associated with the latter selected answer to light and the LED associated with the previously selected answer to extinguish.

The above described process of answering the questions continues for the duration of the test. The test is terminated by an "enable answer comparison" signal which is produced when either the stop button 80 is depressed or when an external signal stopping the test is produced by the master control unit 22. The enable answer comparison signal passes to the answer comparator means 224 by line L12 to enable the test to be scored. At such time, no new answers are accepted and the selected answers are stored by the answer storage means 216 for comparison with the appropriate set of correct answers, as shall be described later.

The answer pattern memory means 222 includes a PROM (a programmable read only memory) which stores the correct sets of answers which are used when grading the overlay examinations. Each correct set of answers is stored as a series of numbers 1, 2, 3, or 4, with each of said numbers corresponding to the position of the correct answer for each respective question. Thus, the number associated with the answer selected by the examinee is compared to the number taken from the correct answer pattern for each respective question such that a correct answer is recognized whenever these respective numbers match.

To that end, the "PROM" in the answer pattern memory means 222 stores up to fifteen different answer sets. The particular answer set which is selected is determined by the "answer pattern select" signal from the phototransistor interface circuit means 200, via line L4.

The answers selected by the examinee are transmitted from the answer storage means 216 by line L44 to the answer comparator means 224. Similarly, the correct answer set is transmitted from the answer pattern memory means 222 to the answer comparator means 224 by line L50. The answer comparator means 224 compares the selected answers with the correct set of answers on a question by question basis, as mentioned above, to generate a test score signal corresponding to the number of correct answers selected. This signal is transmitted by line L46 to the score memory means 232. The score memory means 232 also receives a signal from line L6 identifying which test had been taken. Accordingly, when the sequence button 82 is pushed the appropriate number of times (the number of times necessary to sequence to the test identification number of the particular test), the score memory means 232 transmits a signal to the test pattern display driver means 242 by line L63 and another signal to the score display driver means 234 by line L62. In response to those signals, the test pattern display driver means 242 produces a signal which is converted by the test pattern display means 97 into a two-digit number identifying which test score is being displayed. At the same time, the score display driver means 234 produces a signal which is converted into a three-digit test score number for display by the score display means 99. The score memory means 232 also transmits the score signal and a test identification signal along bus L60 to the printer interface means 244 which converts these signals into signals compatible for use by an electronic printer if one desires hard copy test results. Thus, a printer interface means 244 is provided for connection to an optional printer.

The printer may be any commercially available electronic printing devices such as those typically used in combination with micro-computers. The preferred embodiment of this invention utilizes a conventional "RS232" printer interface means 244 which is compatible with many of the more popular commercially available printers (e.g., the Radio Shack TRS-80 printer line).

In addition to printing all of the information displayed by the indicator means 32, an electronic printer when used produces a listing of the particular answers selected by the examinee for the respective overlay test questions. Thus, the answers are printed in terms of their position on the overlay 26 (e.g., 1, 2, 3 or 4).

Moreover, at this point the start/stop detector means 202 produces an "idle" signal which passes to every other circuit of the station 20 by means of the line L16, placing them in an "idle" state.

The following description is of the test station when running one of the two dexterity tests, manual or finger. In such a case, no overlay is used nor are the answer probe and the foot pedal connected. This fact is sensed by the phototransistor interface circuit 200, the answer probe detector means 204 and the foot pedal detector means 205, respectively, which disables the answer storage means 216 and enables (i.e., actuates) the dexterity counter means 218. When the start/stop detector means 202 is actuated, it produces a "test in progress" signal on line L18 whereupon the dexterity counter means 218 is enabled to accept signals from the dexterity contact detector means 210. The dexterity contact detector means 210 has as its input, the respective front panel dexterity switches located beneath contacts 54A, 54B, 56A and 56B.

A signal generated by the manual/finger select switch 85 determines whether a hand dexterity or finger dexterity test is selected. When the examinee inserts (i.e., threads) the dexterity device (either the knob or the narrow screw) sufficiently deep into one of its respective holes on the front panel, the dexterity contact detector means 210 senses this occurrence and sends a signal to the dexterity counter means 218. If the hole into which the dexterity device is inserted is different from the one into which it had last been inserted, the dexterity counter means 218 increments the score by one. Conversely, if the examinee removes the dexterity device from a hole and then reinserts it into the same hole, the counter does not get incremented. As mentioned above, a front panel indicator LED 64 flashes when either the screw or knob, respectively, is successfully inserted into its proper hole to cause the dexterity counter to be incremented. The examinee, therefore, has visual feedback to assure him or her that the test is being performed correctly and that the dexterity device has been inserted sufficiently far into the hole to register a score. When the test is terminated, as a result of a signal from either the start/stop detector means 202 or from the master control unit 22, no further scores are recorded. Furthermore, the score at the time the stop signal is received is sent to the score memory means 232 by line L49 in a manner similar to that which was described for the overlay tests.

The following is a description of the testing station running the hand/eye coordination test. In such a case, no overlay 26 is used nor is the the foot pedal 72 connected. In this situation, "test select" signals are transmitted on line L6 from the answer probe detector means 204, the foot pedal detector means 205 and the phototransistor interface circuitry means 200 to disable both the answer storage means 216 and the dexterity counter means 218. Conversely, the random generator means 226 and the random answer counter means 230 are both enabled. The "test in progress" signal generated by the start/stop detector means 202 enables the random generator means 226 to randomly cause one of the 120 front panel LED's 44 to illuminate. The examinee then touches the contact or sensor 42 adjacent the lit LED with the probe 28. The answer contact detector means 206 detects this occurrence and transmits a signal to the answer storage means 216, identifying which contact 42 was touched. The answer storage means 216 in turn transmits a corresponding signal to the random answer comparator means 228. The output signal from the random generator means 226 is also transmitted to the random answer comparator means 228. The comparator means 228 then compares these two signals to determine whether the contact 42 touched by the answer probe 28 is the one which is associated with the front panel LED 44 that was lit. If so, the random answer comparator means 228 transmits a signal to the random answer counter means 230 causing a counter in the random answer counter means 230 to be incremented by one. In addition, the random answer comparator means 228 provides a signal on line L56 which causes the random generator means 226 to extinguish the lit LED while illuminating another front panel LED. If an incorrect contact 42 is touched, the lit LED 44 remains lit and no other response occurs until the correct contact 42 is touched. This process continues until the "enable answer comparison" signal from the start/stop detector means 202 signals the end of the test. At that point, the number of correct responses to the hand/eye coordination test is sent to the score memory means 232 in the same manner as is done with each of the other tests.

The following is a description of the testing station running the hand/eye/foot coordination test. In such a case, no overlay 26 is used, but both the probe 28 and the foot pedal 72 are connected in place as previously described. The "test select" signals generated by means 200, 204 and 205 disable the answer storage means 216 as well as the dexterity counter means 218 while at the same time actuating the random generator means 226, the random answer comparator means 228 and the random answer counter means 230.

The operation of the device with regard to the hand-/eye/foot coordination test is quite similar to that of the hand/eye coordination test except that in order to register a score, the random answer comparator means 228 after receiving the signal produced by the probe means 28 touching the sensor 42 associated with the lit LED 44, must then receive a second signal generated by the foot pedal detector means 208, responsive to the foot pedal 72 being depressed. Thus, when the random answer comparator means 228 receives these signals in that order, it generates a signal which is provided on line L56 to the random answer counter means 230 to increment by one the score contained therein. Moreover, another signal is provided on line L56 extenguishing the lit LED, followed by still another signal which causes another randomly selected front panel LED to light. As with the hand/eye coordination test, this process continues until a signal is generated to indicate the end of the examination, upon which time the score and identifying test number are recorded by the score memory means 232 in the same manner as was described for the previous tests.

The sequence detector means 208 enables the test administrator to sequentially display the test scores for all of the examinations taken by the examinee at a given session. To that end, when the test administrator pushes the sequence button 82, the test score for the next numbered test is displayed by the indicator means 32 along with the test identification number of that particular test. Scores on all of the tests previously taken at a test session are obtained by repeatedly pressing the sequence button.

In particular, the pushing of the sequence button causes the sequence detector means 208 to produce a signal which advances the test identification number displayed by the test pattern display means 97. The signal produced by the sequence detector means 208 is provided by line L28 to the score memory means 232 which has stored in its memory the test scores and identification numbers for all of the previously taken examinations.

The score memory means then produces a pair of signals causing the score display driver means 234 and test pattern display driver means 242, respectively, to produce signals causing the score display means 99 to display the test score, and the test pattern display means 97 to display the test identification number for the particular test. Both the test scores and identification numbers remain stored in the score memory means 232 until such time that either the power is disconnected from the test station 20 or the test reset switch 88 is moved to the "reset" position. With regard to the latter, such action causes the test/reset operate detector means 248 to generate a "clear" signal which is transmitted, via line L78 to all of the other modules of the test station to clear those respective modules, e.g., reset the flip-flops, counters, etc., of all information inputted during the test session.

The test/reset operate detector means 248 also generates a "lamp test" signal when the key switch 88 is moved to the "test" position. This signal is transmitted, via line L80 to the test pattern display driver means 242, the front panel LED driver means 238, and the score display driver means 234 to cause all of the front panel LEDs 44 to light and the indicator means 32 to display the test pattern identification number "88" along with the score number "888". This test operation enables the test administrator to determine whether all of the displays (e.g., LEDs) are functioning properly prior to commencing the test.

The power supply 212 is connected to a 110 volt, 60 Hz AC source of electricity via a line cord (not shown). The power is switched either on or off by moving the power switch 84 located on the rear panel of the test station, to either the on or the off position, respectively. The power supply 212 supplies power to all of the circuitry shown in FIGS. 4A and 4B and the master control unit 22 (when utilized). The power supply 212 also supplies a low voltage 60 cycle signal to the master control unit for purposes which shall be described later.

As mentioned earlier, the station includes a practice/abort switch 86 on its rear panel. This switch provides means for the test administrator to erase all of the previously selected answers for the test in progress. In that regard, the practice/abort switch 86 is designed to provide means for enabling a practice or trial run of an examination to occur, affording the examinee an opportunity to get a feel for using the test station 20 prior to taking the actual test. Moreover, the practice/abort switch 86 does not affect scores already stored in memory, i.e., those associated with other tests taken at the same test session, but merely erases the accumulated scores and answers for the particular test being run at that time. To that end, the practice/abort means 249 transmits an "abort signal" to the start/stop detector means 202, the answer storage means 216, the dexterity counter means 218 and the random answer counter means 230 responsive to an actuating signal from the practice/abort switch 86. These signals operate to clear the circuitry of the respective modules so that the test may be restarted.

As mentioned above, in the preferred embodiment of the invention, one or more test stations 20 are simultaneously controlled by a single master control unit 22, as shown in FIG. 3. Notwithstanding the fact that each test station 20 is an entirely self-contained unit and operates satisfactorily without the aid of a master control unit, the master control unit provides the test administrator with ready means for achieving simultaneous, synchronized control over several test stations. In addition, the master control unit 22 provides automatic timing means for stopping the examination after a predetermined amount of time has elapsed.

The master control unit is contained in a generally rectangularly shaped housing or box 100 with all of its controls and displays being located on the top surface 102 of the housing.

Four cables 120A–120D are connected to the rear of the control unit housing 100 with each of said cables arranged for connection to a control box jack 90 (FIG. 2) on the rear surface of a particular test station 20.

The master control unit 22 basically comprises elapsed time display means 106, a time set mechanism 108, a start button 110, a stop button 112, and annunciator means 114.

The test administrator sets the amount of time to be allowed for the test using the time set means 108. The time set means 108 includes four thumb wheels 116, 118, 120 and 122 with thumb wheels 116 and 118 corresponding to minutes and thumb wheels 120 and 122 corresponding to seconds. The amount of time allowed for the exam is displayed by four windows 124 corresponding to the four respective thumb wheels 116–122.

Once the thumb wheels are set for the desired amount of time, the test administrator pushes the start button 110 on the master control unit 22 to start the test. The time display means 106 is a conventional digital LED display which displays the amount of time which has elapsed since the start button was pushed.

The setting of the respective thumb wheels 116–122 establishes a number of counts (e.g., seconds) which is stored in means to be described later. When this number of counts is equal to the amount of elapsed time (e.g., seconds) as displayed by the time display means 106, a "time-out" signal is generated, causing an audible signal to be generated by the annunciator means 114 to indicate that the the test time has expired. Furthermore, additional "end of test" signals are generated by the master control unit 22 and transmitted, via lines 120A–120D to each respective test station 20, to signal the end of the test. The "end of test" signal has the same effect on the test stations 20 that depressing the respective stop buttons 80 on each test station 20 has. The test administrator may override the timing mechanism 108 at any time during the course of an examination by pushing the stop button 112 on the master control unit. When this happens, the audible signal is sounded and the testing operation stops, in the same manner as described above.

Figure 5:
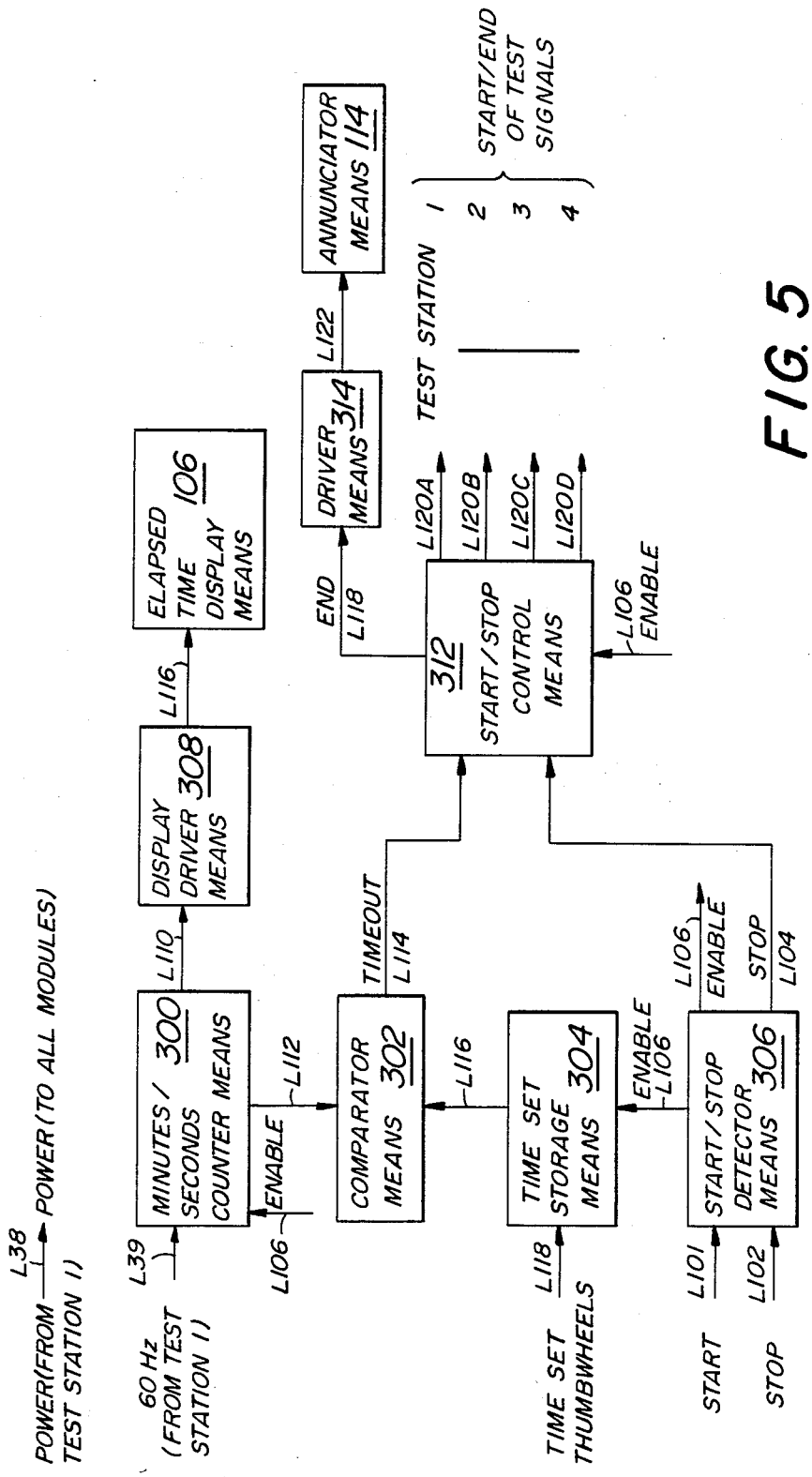
FIG. 5 is a functional block diagram of the master control unit.

A detailed description of how the master control unit operates is best presented by referring to a functional block diagram, such as the one shown in FIG. 5. In that regard, the circuitry comprising the individual functional blocks shown in FIG. 5 is conventional in design and operation, while the interconnection and interrelationship between the different circuit blocks forms one aspect of the invention.

The master control unit 22 includes the following circuits: minutes/second counter means 300, comparator means 302, time set storage means 304, start/stop detector means 306, display driver means 308, elapsed time display means 106, start/stop control means 312, driver means 314, and annunciator means 114.

The circuits shown in FIG. 4B are interconnected as follows: the minutes/seconds counter means 300 is connected by line L39 to test station No. 1. The minutes/seconds counter means is also connected to the display driver means 308 by line L110 and to the comparator means 302 by line L112. The comparator means 302 is connected to the start/stop control means 312 by line L114. The time set storage means 304 is connected to the time set means (thumb wheels) 108 by line L118 and to the comparator means 302 by line L116. The start/stop detector means 306 is connected to the master control unit start button 110 by line L101, to the master control unit stop button 112 by line L102, and to the start/stop control means 312 by line L104. The start/stop detector means 306 is also connected to the time set storage means 304, to the minutes/seconds counter means 300 and to the start/stop control means 312 by line 106. The display driver means 308 is connected to the elapsed time display means 106 by line L116. The start/stop control means 312 is connected to the driver means 314 by line L118. The start/stop control means 312 is also connected to each test station 20 by lines L120A, L120B, L120C and L120D, with line L120A being connected to test station No. 1, line L120B being connected to test station No. 2, line L120C being connected to test station No. 3, and line L120D being connected to test station No. 4, when four test stations are used. The driver means 314 is connected to the annunciator means 114 by line L122. In addition, each of the circuits of the master control unit 22 is connected to test station No. 1 by power line L38. Therefore, it is necessary that when the master control unit 22 is used, in a test system, at least one test station 20 be connected to the test station jack designated "test station No. 1".

With the master control unit 22 in operation, the test begins when the test administrator pushes the start button 110. This action causes an "enable" signal to be generated by the start/stop detector means 306. The "enable" signal is provided by line L106 to the time set storage means 304, the start/stop control means 106 and the minutes/seconds counter means 300. In response to the enable signal, the start/stop control means 312 generates a start signal which is transmitted along lines L120A–L120D to each of the respective test stations, thus commencing test operation. The enable signal also latches the time set storage means 304 to the time which was set just prior to the start button 110 being pushed to prevent any further changes in the time set from occurring should the time set means 108 (e.g., the time set thumb wheels) be inadvertently or otherwise moved. The enable signal also actuates the minutes/seconds counter means 300 to start the timer.

One method of stopping the test is by pushing the stop button 112. When the stop button 112 is pushed the start/stop detector means 306 transmitts a "stop" signal, via line L104 to the start/stop control means, which in turn transmits a stop signal, via lines L120A–L120D to each of the respective four test stations, stopping the examination.

When the test is begun by the administrator pushing the start button 110, the minutes/seconds counter means 106 provides a timing signal, via line L110 to the display driver means 308. The minutes/seconds counter means 300 functions as a timing device by dividing the 60 cycle signal it receives from test station No. 1, via line L108, into 60 equal parts or counts to produce signals generated at one second intervals. The seconds/minutes counter means 300 counts these signals (i.e., one each second) and outputs a timing signal corresponding to the number of seconds and minutes which have elapsed since the start button was pushed. The timing signal is then transmitted, via line L110 to the display driver means 308 which in turn transmits a corresponding signal, via line L116 to the elapsed time display means 106.

The test continues until such time that either the stop button 112 is pushed, as described above, or alternatively, the test time as set by the time set means 108, has elapsed. With regard to the latter, the time set storage means 304 records the number of counts (e.g., seconds) corresponding to the setting of the thumb wheels 116–122 and generates a signal which corresponds to this amount of time. This signal is transmitted to the comparator means 302. The comparator means 302 also receives a signal, via line L112, from the minutes/seconds counter means 300 corresponding to the amount of time (e.g., the number of one-second counts), which has elapsed since the start button was pushed. The comparator means 302 then compares these two signals such that when the elapsed time signal from the minutes/seconds counter means is equal to or greater than the time as set by the time set storage means 304, a "time-out" signal is generated and transmitted, via line L114 to the start/stop control means 312. As described above, the start/stop control means 312 then causes an audible alarm to be sounded and transmits a signal to each of the respective test stations, via lines L120A–L120D, respectively, to terminate the test.

Although the test station 20 and the master control unit 22 are shown and described as comprising a plurality of discrete electronic modules or circuits, it should readily be appreciated that much of the electronic hardware comprising the device 20 could alternatively be constructed as one or more microprocessor circuits or chips constructed to perform the functions shown and described herein.

In that regard, it is contemplated that a commercial embodiment of the device 20 would utilize a microprocessor chip(s) and associated program means to replace the discrete logic components of the test station device, e.g., the answer storage means 216, the dexterity counter means 218, the answer pattern memory means 222, the answer comparator means 224, the random generator means 226, the random answer comparator means 228, the random answer counter means 230, the score memory means 232.

It is further contemplated that such an embodiment would not only provide raw score information for the various tests but would also include programming to provide standardized performance scores and a comprehensive alpha numeric evaluation of the examinee's aptitudes based on his or her performance on one or more individual tests.

Moreover, the microprocessor chip(s) could readily be programmed to automatically produce an end of test signal after certain predetermind periods of time have elapsed for the respective tests, thus obviating the need for the time set thumb wheels 118-124, the minutes/-seconds counter means 300, the comparator means 302, the time set storage means 304, the display driver means 308, and the elapsed time display means 106 in the master control unit. Thus, the master control unit would only provide means for enabling the test administrator to simultaneously start several test stations and means for overriding the automatic timing means of the respective test stations in order to manually stop the test before the allotted time has expired.

Another embodiment of the master control unit which is contemplated would further comprise a microprocessor chip and associated program means enabling the unit to also remotely control the operation of the optional printer as well as to provide job description and title information to the printer regarding jobs the examinee's aptitudes make him or her best suited for.

Thus, as will be appreciated from the foregoing, the device 20 is an efficient, easy to use and highly effective means for measuring a person's vocational aptitudes.

Without further elaboration, the foregoing will so fully illustrate our invention that others may, by applying current or future knowledge, readily adapt the same for use under various conditions of service.

We claim:

1. An electronic testing device which utilizes a plurality of objectives test questions to evaluate an examine wherein said device comprises a housing, overlay means which is releasably secured to said housing, said overlay means containing indicia forming a plurality of questions and a plurality of possible answers corresponding to each of said questions, said overlay means further including coding means which communicates with corresponding means on said housing to specify a set of correct answers to said questions, selector means for enabling said examinee to select an answer for each of said questions, answer storage means for storing answers selected by the examinee, answer pattern memory means for storing the set of correct answers for particular test and comparison means for comparing said selected answers with said set of correct answers following completion of said test and producing a signal which is transmitted to an indicator means, resulting in the indicator means producing a test score signal indicative of the degree of correspondence between said correct set of answers and said selected answers, to evaluate the examinee's level of performance on said test.

2. The device of claim 1, wherein said selector means comprises a plurality of electronic sensors situated on said housing with each of said sensors corresponding to a particular answer on said overlay means, and probe means which contacts a particular sensor means in order to select the particular answer associated with that sensor means.

3. The device of claim 2, further comprising manipulative skill measuring means for evaluating hand and eye coordination including means for measuring the speed with which the examinee is able to touch said probe to a plurality of sensors.

4. The device of claim 3, further comprising pedal means, wherein in order to register a correct response on said test, the examinee must manipulate said pedal means using his or her foot, after a particular sensor has been touched with said probe.

5. The device of claim 4, wherein said pedal means comprises a foot pedal which when depressed produces an electrical signal.

6. The device of claim 5, further comprising foot pedal detector means and random answer comparator means, wherein said foot pedal is coupled to said foot pedal detector means and said foot pedal detector means is coupled to said random answer comparator means, so that when said foot pedal is depressed, a signal is transmitted from said foot pedal detector means to said random answer comparator means.

7. The device of claim 3, wherein the manipulative skill measuring means for evaluating hand and eye coordination includes means for measuring the speed with which the examinee is able to touch said probe to a plurality of sensors in a specified sequence, said sequence being specified by a visual signal occurring adjacent the sensor which the examinee is required to next touch with said probe.

8. The device of claim 7, wherein said sequence of visual signals is random generated by random generator means.

9. The device of claim 8, wherein each visual signal remains on until such time that its corresponding sensor is contacted by said probe, at which time said visual signal is extinguished and another randomly generated visual signal occurs.

10. The device of claim 9, further comprising random answer comparator means which produces a correct response signal when said probe is touched to the correct sensor and random answer counter means which counts the number of said correct response signals produced during a predetermined time interval.

11. The device of claim 3, wherein said probe is touched to said sensors by its being positioned so that its tip makes direct physical contact with a contact of said sensors.

12. The device of claim 3, wherein the plurality of sensors include the same electronic sensors that correspond to particular answers when said overlay means is secured to said housing.

13. The device of claim 3, further including means for sequentially generating a visual signal adjacent the sensors which the examinee is required to next touch with the probe for establishing a specified sequence for the examinee to follow.

14. The device of claim 1, wherein said corresponding means comprises a plurality of optical sensors which communicate with said coding means to select the answer set corresponding to the particular overlay means being utilized.

15. The device of claim 14, wherein said corresponding means comprises test pattern select means for transmitting a test pattern select signal to the answer pattern memory means in response to said coding means, to select the specific set of correct answers to be used in determining whether the examinee's selected answers are correct for the particular test being conducted.

16. The device of claim 1, further comprising visual means which indicate to the examinee which answer he has selected for each respective question.

17. The device of claim 16, further comprising detector means for generating a lamp test signal to illuminate said visual means prior to a test being administered in order to determine whether said visual means are functioning properly.

18. The device of claim 1, further comprising memory means for recording said test score.

19. The device of claim 18, further comprising means for sequentially displaying a plurality of test scores corresponding to a plurality of tests taken by the examinee.

20. The device of claim 19, wherein said means for sequentially displaying a plurality of test scores comprises score memory means coupled to sequence detector means, whereby said score memory means produces test socre signals indicative of the examinee's score on each test taken during a test session, upon receiving a sequencing signal from said sequence detector means.

21. The device of claim 1, further comprising means for making a hard copy of said test score.

22. The device of claim 1, further comprising manipulative skill measuring means for evaluating the examinee's manipulative motor skills.

23. The device of claim 22, wherein said manipulative skill measuring means comprises means for evaluating hand and eye coordination.

24. The device of claim 22, wherein said manipulative skill measuring means comprises means for evaluating manual dexterity.

25. The device of claim 24, wherein said manual dexterity evaluating means comprises a test which measures the number of times the examinee is able to thread a threaded member into and out of a correspondingly threaded hole within a predetermined amount of time.

26. The device of claim 22, wherein said manipulative skill measuring means comprises means for evaluating finger dexterity.

27. The device of calim 26, wherein said finger dexterity evaluating means comprises a test which measures the number of times the examinee is able to thread a threaded member into and out of a correspondingly threaded hole within a predetermined amount of time.

28. The device of claim 22, wherein said manipulative skill measuring means comprises means for evaluating hand, eye and foot coordination.

29. The device of claim 1, further comprising a plurality of different sets of test questions contained on a plurality of interchangable overlay means.

30. The device of claim 1, further comprising a master control unit constructed to provide means for simultaneous and synchronized control over a plurality of said testing devices.

31. The device of claim 30, wherein said master control unit further comprising timing means which automatically terminates an examination once a preselected amount of time has elapsed.

32. The device of claim 1, wherein said answer pattern memory means comprises a programmable read only memory capable of storing a plurality of correct answer sets.

33. An electronic testing device for both measuring the manipulative motor skill of an examinee and evaluating an examinee's response to questions, characterized in that said device includes a housing, overlay means which is releasably securable to said housing, said overlay means containing indicia forming a plurality of questions and a plurality of possible answers corresponding to each of said questions, selector means for enabling said examinee to select an answer for each of said questions, said selector means comprising a plurality of electronic sensors situated on said housing with each of said sensors corresponding to a particular answer on said overlay means, and probe means for contacting a particular sensor in order to select the particular answer associated with the sensor, and manipulative skill measuring means for evaluating the examinee's manipulative motor skills, said measuring means comprising means for measuring the speed with which the examinee is able to touch said probe means to a plurality of sensors that also correspond to answers to questions when said overlay is secured to said housing to thereby evaluate hand and eye coordination of the examinee.

34. The device of claim 33 further comprising coding means included on the overlay means for cooperating with corresponding means on the housing when said overlay means is secured to the housing to convert the device from a manipulative motor skill testing device to a device for evaluating the examinee's responses to questions.

35. The device of claim 33 wherein said manipulative skill measuring means further includes foot actuable means, whereby said measuring means is employed for evaluating hand, eye and foot coordination.

36. The device of claim 35 wherein said foot actuable means comprises a foot pedal which produces an electrical signal when depressed.

37. The device of claim 36 further comprising foot pedal detector means and random answer comparator means, wherein said foot pedal is coupled to said foot pedal detector means and said foot pedal detector means is coupled to said random answer comparator means, so that when said foot pedal is depressed, a signal is transmitted from said foot pedal detector means to said random answer comparator means.

* * * * *

UNITED STATES PATENT AND TRADEMARK OFFICE
CERTIFICATE OF CORRECTION

PATENT NO. : 4,541,806
DATED : September 17, 1985
INVENTOR(S) : Bonnie L. Zimmerman, et al.

It is certified that error appears in the above-identified patent and that said Letters Patent are hereby corrected as shown below:

On front face of patent, paragraph [75], change "Philip S. DeVita" to --Philip S. Divita--.

Signed and Sealed this

Eighteenth Day of February 1986

[SEAL]

Attest:

DONALD J. QUIGG

Attesting Officer

Commissioner of Patents and Trademarks